Sept. 20, 1932.  L. B. STOWELL  1,878,648
LAWN MOWER SHARPENER
Filed Nov. 6, 1929  2 Sheets-Sheet 1

Inventor
L. B. Stowell.
By Lacey & Lacey, Attorneys

Sept. 20, 1932.  L. B. STOWELL  1,878,648
LAWN MOWER SHARPENER
Filed Nov. 6, 1929  2 Sheets-Sheet 2
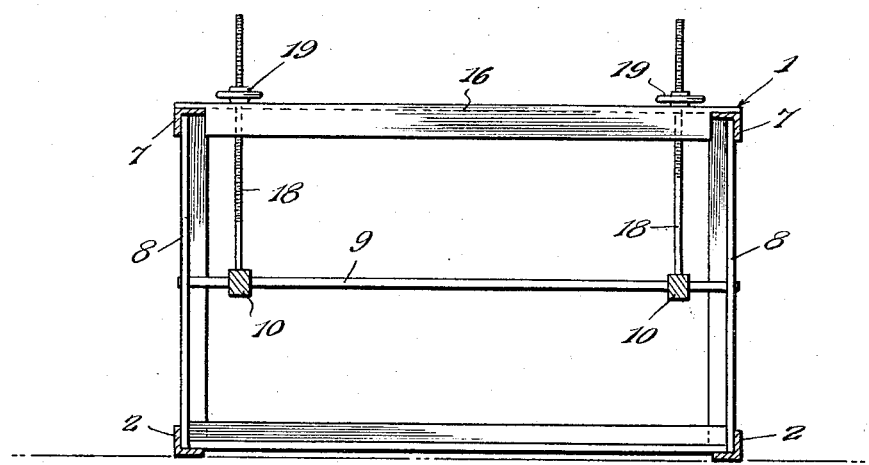
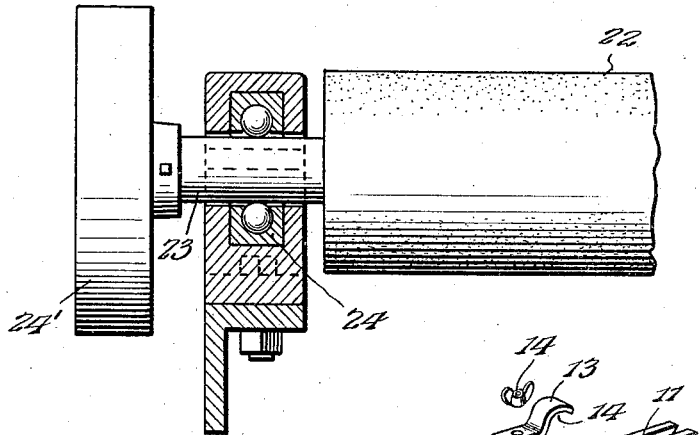
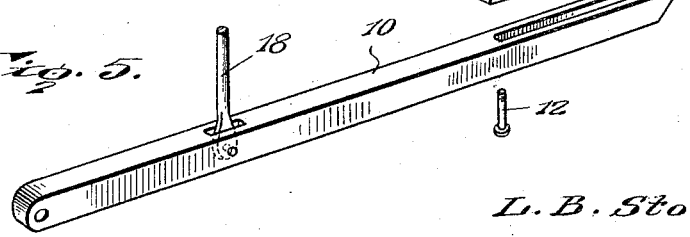
Inventor
L. B. Stowell.
By Lacey & Lacey,
Attorneys Patented Sept. 20, 1932

1,878,648

UNITED STATES PATENT OFFICE

LEONARD B. STOWELL, OF ONTARIO, OREGON, ASSIGNOR TO STOWELL MANUFACTURING CO., OF ONTARIO, OREGON, A CORPORATION OF OREGON

LAWN MOWER SHARPENER

Application filed November 6, 1929. Serial No. 405,201.

The present invention is directed to improvements in lawn mower sharpeners.

The primary object of the invention is to provide a device of this character so constructed that the lawn mower can be easily and quickly mounted for sharpening the blades thereof by merely removing the ground or driving wheels of the mower.

Another object of the invention is to provide a device of this character so constructed that the blades of the mower can be accurately adjusted for engagement with the grinding or sharpening roll.

Another object of the invention is to provide a device of this character which is exceedingly simple in construction, efficient in operation, durable, and one which can be manufactured at a minimum cost.

With these and other objects in view, this invention resides in the novel features of construction, formation, combination and arrangement of parts to be hereinafter more fully described, claimed and illustrated in the accompanying drawings, in which:

Figure 3 is a sectional view on the line 3—3 of Figure 1.

Figure 4 is a sectional view through one of the bearings for the grinding roll.

Figure 5 is a perspective view of one of the supporting bars.

Figure 1:
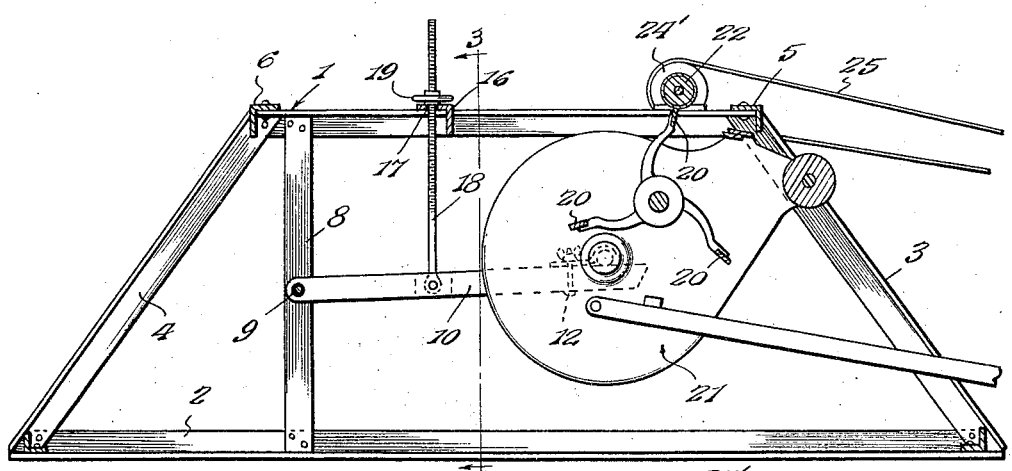
Figure 1 is a longitudinal sectional view through the device, showing the mower engaged therewith.
Figure 2:
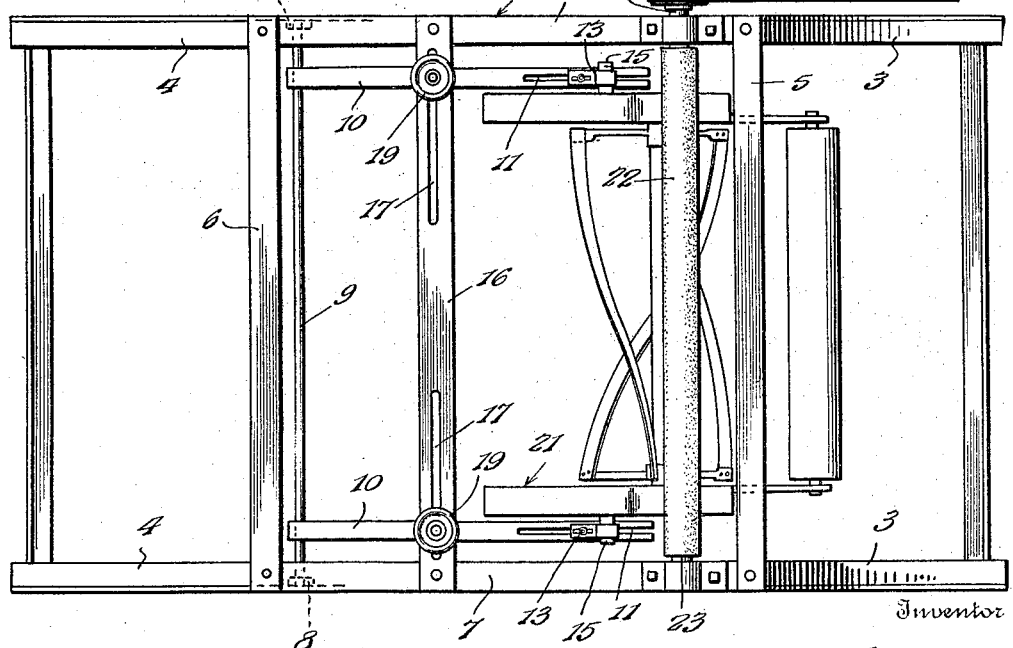
Figure 2 is a top plan view.

Referring to the drawings, 1 designates a frame formed from angle iron and consisting of laterally spaced base bars 2 which have secured to their front and rear ends, inclined end bars 3 and 4. The upper ends of the bars 3 and 4 are secured to cross bars 5 and 6, respectively, and to the ends of the upper side bars 7. A pair of vertical bars 8 connect the bars 2 and 7 near the rear ends thereof and serve to support the transverse rod 9.

A pair of mower supporting bars 10 is provided and these bars have their rear ends pivotally and slidably engaged upon the rod 9. The forward ends of the bars 10 are provided with kerfs 11 for adjustably receiving the bolt 12, said bolt serving to hold the clip 13 in adjusted position upon the bars, upon manipulating the thumb nut 14. The clips 13 are provided with seats 14 adapted to receive the axle of the mower upon removal of the wheels thereof.

A transverse bar 16 is supported by the bars 7 and is provided with longitudinal slots 17 to permit lateral adjustment of the hangers 18. The lower ends of the hangers 18 are pivotally connected to the bars 10 and are threaded for engagement with the adjusting wheels 19 which bear upon the bar 16. Obviously, rotation of the wheels 19 will raise or lower the hangers 18 to adjust the bars 10 so that the cutting blades 20 of the mower 21 can be adjusted properly with respect to the grinding roll 22. The roll 22 is covered with emery cloth or other suitable abrasive material and has its trunnions 23 fixed in ball bearings 24 supported by the bars 7. A pulley 24' is fixed to one of the trunnions 23 and is driven by a belt 25 to impart rotary movement to the roll. The belt may be driven from any suitable source.

In use, the ground wheels of the mower are removed and the axle 15 thereof placed upon the bars 10, whereupon the clips are clamped in adjusted position with the seats 14 thereof engaged with the axle. The mower is inverted when the cutting blades 20 thereof are to be sharpened, after which the roller is started and the cutting blades successively engaged therewith until properly sharpened. It will, of course, be understood that the hangers 18 will be vertically adjusted before the roller is started in order that the cutting blades will be held properly in contact therewith during the sharpening operation.

From the foregoing, it is thought that the operation and many advantages of the herein described invention will be apparent to those skilled in the art without further description and it will be understood that various changes in the size, shape, proportion and minor details of construction may be resorted to without departing from the spirit or sacrificing any of the advantages of the invention.

What is claimed is:

1. A lawn mower sharpener comprising a frame, mower supporting bars pivotally mounted at one end on the frame and adjustable transversely of the frame, means for clamping a mower in inverted position upon the free ends of the said bars including bolts and clips adjustable along the length of the bars, a grinding roll on the frame above said bars engageable with the mower blades throughout their length, hangers connected with the mower supporting bars and adjustable therewith transversely of the frame, and elements threaded on the hangers and engageable with the frame to pivotally adjust the bars and regulate the grinding of the mower blades.

2. A lawn mower sharpener comprising a frame, said frame including a transverse rod and bar, the latter being longitudinally slotted and located above the rod, mower supporting bars pivotally mounted at one end on the rod and adjustable transversely, means for clamping a mower in inverted position upon the free ends of the bars, a grinding roll on the frame above the mower-supporting bars and engageable with the mower blades throughout their length, hangers connected with the mower-supporting bars and passing through the slotted transverse bar, and elements threaded on the hangers and engaging the transverse bar to pivotally adjust the mower supporting bars and regulate the grinding of the mower blades.

3. A lawn mower sharpener comprising a frame, a transverse rod in the frame, a transverse bar at the top of the frame having slots adjacent its ends extending transversely of the frame, mower-supporting bars slidably pivoted upon said bar and extending therefrom longitudinally of the frame below the transverse bar at the top of the frame, said mower-supporting bars having longitudinal slots at their free ends, clips resting on the mower-supporting bars at the slotted free ends of the same to engage over the axle of a mower resting on said bars, fastening devices carried by said clips and passing through the slots in the mower-supporting bars, a grinding roll on the frame above the mower-supporting bars, hangers passing vertically through the slots in the transverse bar at the top of the frame and pivoted at their lower ends to the mower-supporting bars between the ends of the latter, and wheels having threaded engagement with the upper end portions of the hangers and resting on said transverse bar.

In testimony whereof I affix my signature.

LEONARD B. STOWELL.